(12) United States Patent
Kovacik et al.

(10) Patent No.: US 7,325,944 B2
(45) Date of Patent: *Feb. 5, 2008

(54) RECHARGEABLE LED UTILITY LIGHT

(75) Inventors: James D. Kovacik, Brecksville, OH (US); Paul S. Blanch, Broadview Heights, OH (US); Joseph J. Smith, Wooster, OH (US)

(73) Assignee: Alert Safety Lite Products Co., Inc., Bedford Heights, OH (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/200,568

(22) Filed: Aug. 10, 2005

(65) Prior Publication Data

US 2006/0034078 A1 Feb. 16, 2006

Related U.S. Application Data

(63) Continuation-in-part of application No. 10/914,805, filed on Aug. 10, 2004, now Pat. No. 7,175,303, and a continuation-in-part of application No. 10/915,527, filed on Aug. 10, 2004, now Pat. No. 7,150,540, and a continuation-in-part of application No. 29/234,468, filed on Jul. 19, 2005, now Pat. No. Des. 528,240.

(51) Int. Cl.
*F21V 23/04* (2006.01)

(52) U.S. Cl. .................. 362/251; 362/196; 362/240; 362/396; 362/800

(58) Field of Classification Search ................ 362/251, 362/183, 184, 186, 205, 236, 237, 240, 241, 362/295, 396, 800, 190, 191, 200, 206, 376, 362/362

See application file for complete search history.

(56) References Cited

U.S. PATENT DOCUMENTS

| 1,977,086 | A | * | 10/1934 | Pryor ........................ 362/208 |
| D135,092 | S | | 2/1943 | Biller |
| 4,262,327 | A | | 4/1981 | Kovacik et al. |
| 4,442,984 | A | | 4/1984 | Bayat |
| 4,774,647 | A | | 9/1988 | Kovacik et al. |

(Continued)

FOREIGN PATENT DOCUMENTS

DE 198 02 998 8/1998

(Continued)

OTHER PUBLICATIONS

Ferret Worklite AC, Jun. 4, 2002, www.ferretinstruments.com.

(Continued)

*Primary Examiner*—Sandra O'Shea
*Assistant Examiner*—Gunyoung T. Lee
(74) *Attorney, Agent, or Firm*—Fraser Clemens; Martin & Miller LLC; William J. Clemens

(57) ABSTRACT

A portable rechargeable LED utility light is releasably retained in a charging base for recharging an internal battery. Light is provided by an array of LEDs, typically rows and columns, that can be connected to the battery in groups by a switch having at least two "on" positions. The light has at least one hook member stored in a recess in the back of the housing and a pair of handle cushions.

20 Claims, 7 Drawing Sheets

U.S. PATENT DOCUMENTS

| | | | |
|---|---|---|---|
| 4,929,199 A | 5/1990 | McKinnon | |
| 5,023,764 A | 6/1991 | McKinnon et al. | |
| 5,188,450 A * | 2/1993 | Anderson | 362/194 |
| D348,249 S | 6/1994 | Hester | |
| 5,424,927 A * | 6/1995 | Schaller et al. | 362/157 |
| 5,436,815 A | 7/1995 | Grooms et al. | |
| 5,700,089 A | 12/1997 | McKinnon | |
| 5,765,941 A | 6/1998 | Vest | |
| 5,806,961 A * | 9/1998 | Dalton et al. | 362/183 |
| 5,818,234 A | 10/1998 | McKinnon | |
| 5,871,272 A * | 2/1999 | Sharrah et al. | 362/184 |
| 5,921,658 A | 7/1999 | Kovacik et al. | |
| 5,975,719 A | 11/1999 | Reiff et al. | |
| D421,142 S | 2/2000 | Bayat | |
| D421,143 S | 2/2000 | Kovacik et al. | |
| 6,176,592 B1 | 1/2001 | Kovacik et al. | |
| 6,260,442 B1 | 7/2001 | Bayat | |
| 6,367,949 B1 | 4/2002 | Pederson | |
| 6,386,736 B1 | 5/2002 | Reiff et al. | |
| 6,485,160 B1 * | 11/2002 | Sommers et al. | 362/184 |
| 6,534,926 B1 | 3/2003 | Miller et al. | |
| D483,508 S | 12/2003 | Galvez | |
| D483,893 S | 12/2003 | Galvez | |
| D484,628 S | 12/2003 | Bayat et al. | |
| 6,663,265 B2 | 12/2003 | Kovacik et al. | |
| D486,599 S | 2/2004 | Bayat et al. | |
| 6,722,774 B2 | 4/2004 | Kovacik et al. | |
| D502,276 S | 2/2005 | Kovacik et al. | |
| 6,979,104 B2 * | 12/2005 | Brass et al. | 362/231 |
| 2002/0191396 A1 | 12/2002 | Reiff et al. | |
| 2003/0123254 A1 | 7/2003 | Brass et al. | |
| 2003/0179572 A1 | 9/2003 | Schnell | |

FOREIGN PATENT DOCUMENTS

| | | |
|---|---|---|
| DE | 203 17 017 | 3/2004 |
| WO | WO 02/03761 | 1/2002 |

OTHER PUBLICATIONS

Bayco SL-2105, Bayco SL-2106, Apr. 1, 2003, www.budgetlighting.com.

* cited by examiner

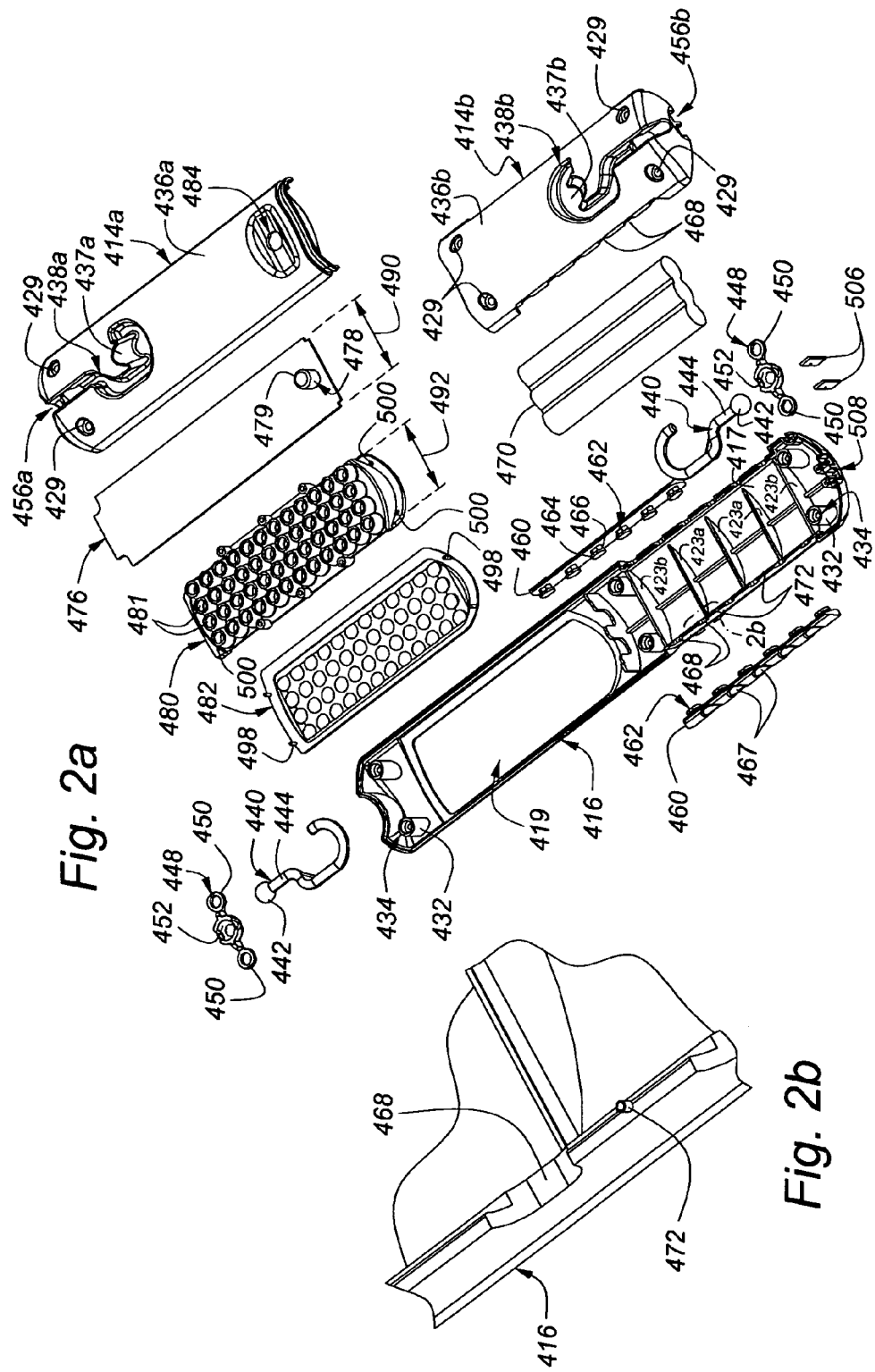

RECHARGEABLE LED UTILITY LIGHT

CROSS-REFERENCE TO RELATED APPLICATIONS

This application is a continuation-in-part of each of the U.S. patent application Ser. No. 10/914,805 filed Aug. 10, 2004 now U.S. Pat. No. 7,175,303, the U.S. patent application Ser. No. 10/915,527 filed Aug. 10, 2004 now U.S. Pat. No. 7,150,540 and the U.S. patent application Ser. No. 29/234,468 filed Jul. 19, 2005 now U.S. Pat. No. D,528,240.

BACKGROUND OF THE INVENTION

The present invention relates generally to illumination devices and, in particular, to a utility light having a light source configured as an array of LEDs.

Portable lights, which can be manually moved and suspended about a work site to aid a user to obtain the best lighting conditions, are well known. It has been the practice to use incandescent light bulbs, suitably encased in light guards, for this purpose. Such lights are often referred to as trouble lamps, extension lights, work lights, inspection lights, utility lights, and the like, and are commonly employed by mechanics and other workers who require a concentration of light while frequently changing locations. Such a trouble light is shown in the U.S. Pat. No. 4,774,647 to Kovacik et al. Fluorescent lights have several advantages in use as compared with the incandescent bulbs. As an example, for the same wattage fluorescent lights usually provide more light with less glare. In the past, attempts have been made to convert portable lights such as extension lights to fluorescent tubes. For example, see the U.S. Pat. No. 5,921,658 to Kovacik et al.

Light emitting diodes (LEDs) are well known for providing illumination to digital displays and the like. It has become more common for an array of LEDs to be utilized for providing illumination. LEDs are particularly advantageous because of their low power consumption per candlepower produced when compared to incandescent light bulbs and, to a lesser degree, to fluorescent light bulbs.

It is desirable to provide a portable light having lower power consumption that also provides sufficient illumination for a work site. It is also desirable to be able to place and orient the portable light in as many locations and positions as possible. It is further desirable to provide a utility light that does not require the use of an external power supply cord. It is always desirable to provide utility lamps that are lightweight and cost-effective to produce.

SUMMARY OF THE INVENTION

The present invention concerns a portable rechargeable utility light including an elongated front housing portion having a lens opening formed therein, a rear housing portion having a hook recess and a switch aperture formed therein, the rear housing portion being attached to the front housing portion to form a hollow light housing, and a pair of handle cushions attached to the light housing. A rechargeable battery is mounted in the housing and is selectively connected to a plurality of LEDs mounted in the housing adjacent the lens opening by a switch mounted in the switch aperture.

A hook member is attached to the housing for movement between a stored position in the hook recess and a use position out of the hook recess. A reflector member is mounted in the housing and has a plurality of apertures formed therein, each of the apertures receiving an associated one of the LEDs. A transparent lens member mounted in the lens opening permits light generated by said LEDs to exit the housing. A pair of electrical contacts is mounted on the housing and is connected to the battery. A charging base for releasably retaining the light housing provides electrical power through the electrical contacts to recharge the battery. A low battery detector is connected to the battery, an indicator aperture is formed in the front housing portion and a low battery indicator is mounted in the indicator aperture and is connected to the low battery detector for visually indicating a low battery condition of the battery.

The switch can have a first "on" position for connecting a first group of the LEDs to the battery, the first group being less than all of the LEDs, and at least a second "on" position for connecting a second group of the LEDs to the battery, the second group including at least all of the LEDs not included in the first group.

The LEDs are mounted on a circuit board in rows and columns. The reflector member has a reflective surface facing the lens member. The lens member has a plurality of focusing portions formed thereon facing the LEDs for focusing light generated by the LEDs. In the alternative, the lens member can be flat or have concave portions for generating a flood light effect.

The LED utility light in accordance with the present invention advantageously provides a portable handheld utility light that does not need to be connected constantly to an external power supply and may be placed and oriented in many locations and positions with the use of the hook member.

DESCRIPTION OF THE DRAWINGS

The above, as well as other advantages of the present invention will become readily apparent to those skilled in the art from the following detailed description of a preferred embodiment when considered in the light of the accompanying drawings in which:

FIG. 2 is an exploded perspective view of the LED utility light of FIG. 1;

FIG. 2a is an enlarged fragmentary perspective view of an area of the front housing portion shown in FIG. 2;

DESCRIPTION OF THE PREFERRED EMBODIMENT

The following patent applications are incorporated herein by reference: U.S. patent application Ser. No. 10/914,805 filed Aug. 10, 2004; U.S. patent application Ser. No. 10/915,527 filed Aug. 10, 2004; and U.S. patent application Ser. No. 29/234,468 filed Jul. 19, 2005.

Figure 1:
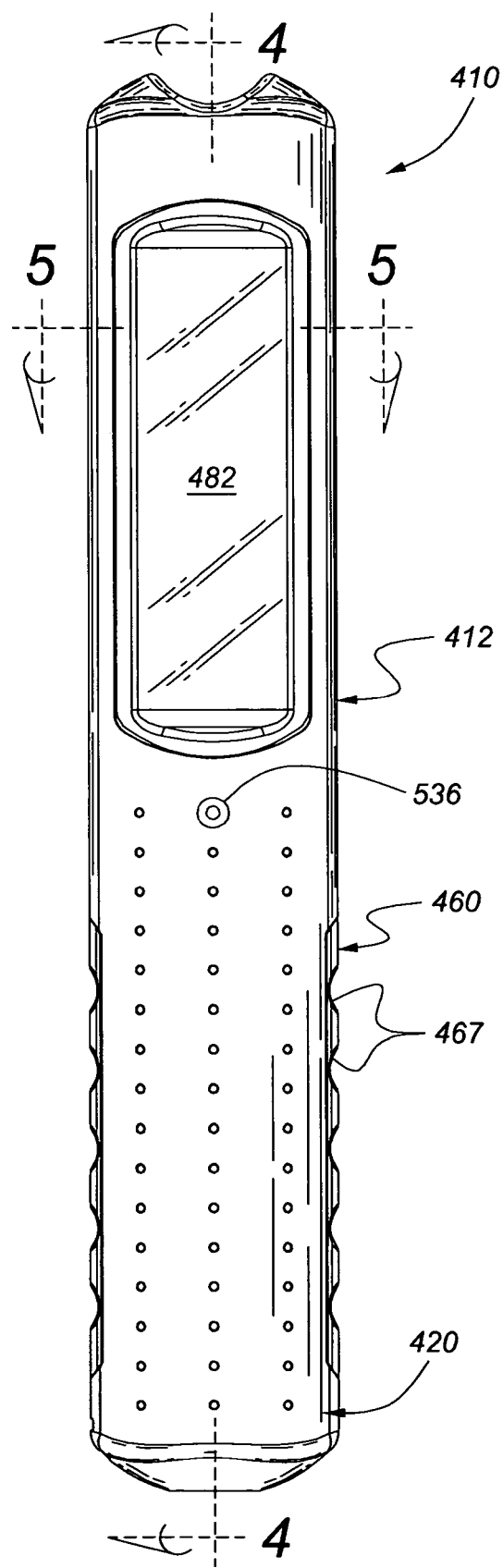
FIG. 1 is a front elevation view of an LED utility light in accordance with the present invention.
Figure 3A:
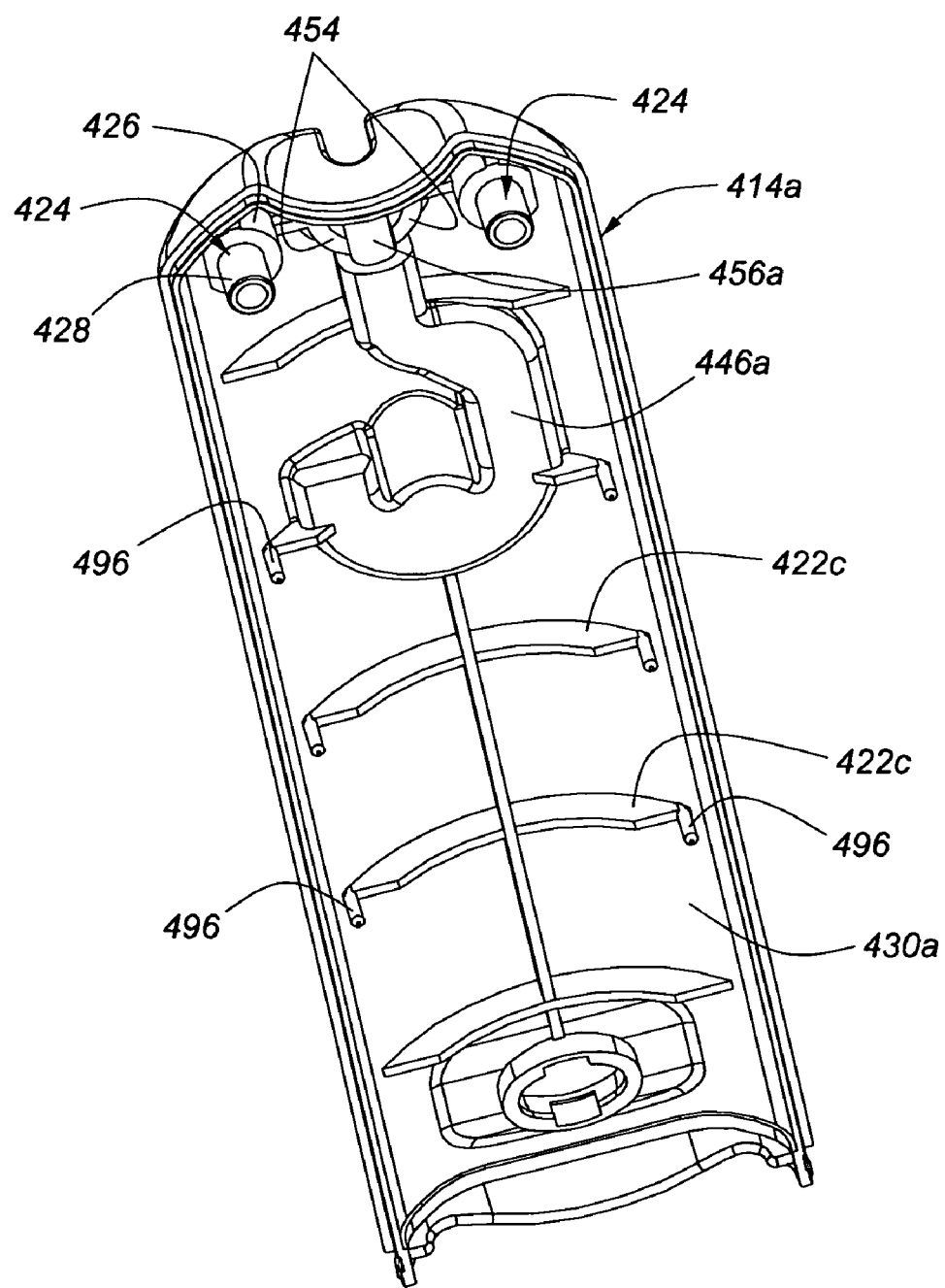
FIGS. 3a and 3b are perspective views of the interior of the rear housing portions of the utility light shown in FIG. 1.
Figure 3B:
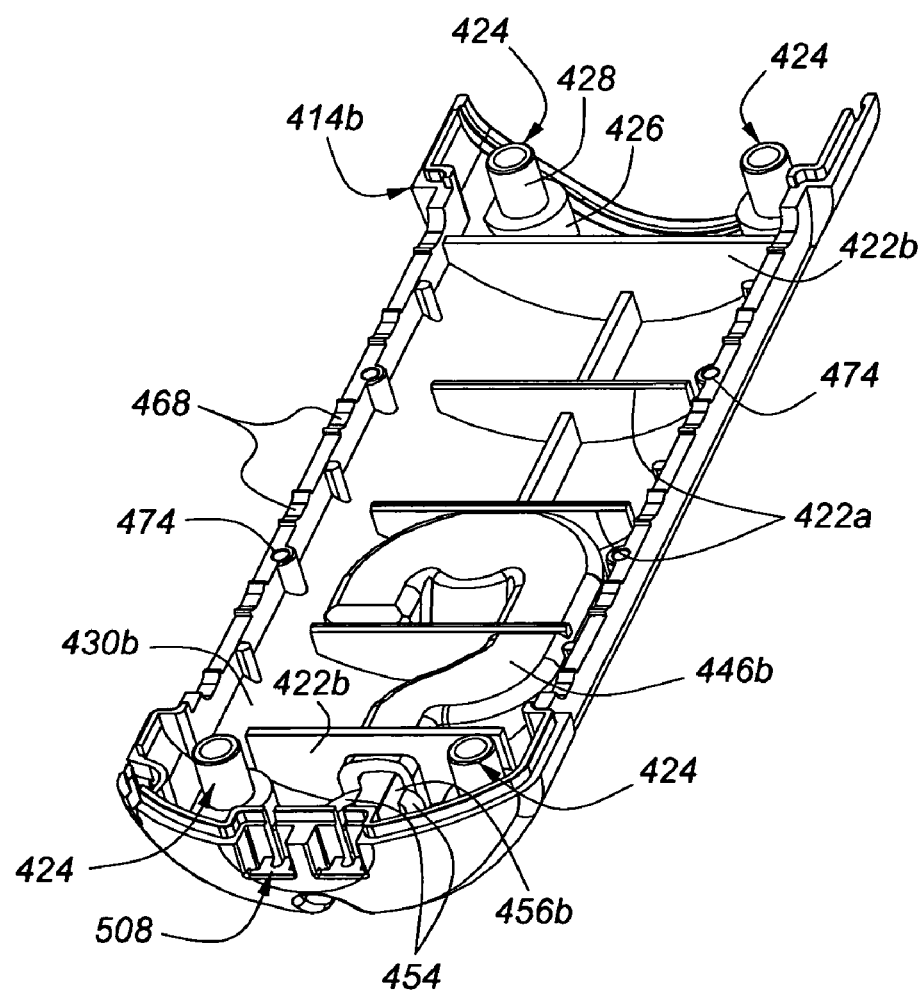
Figure 4:
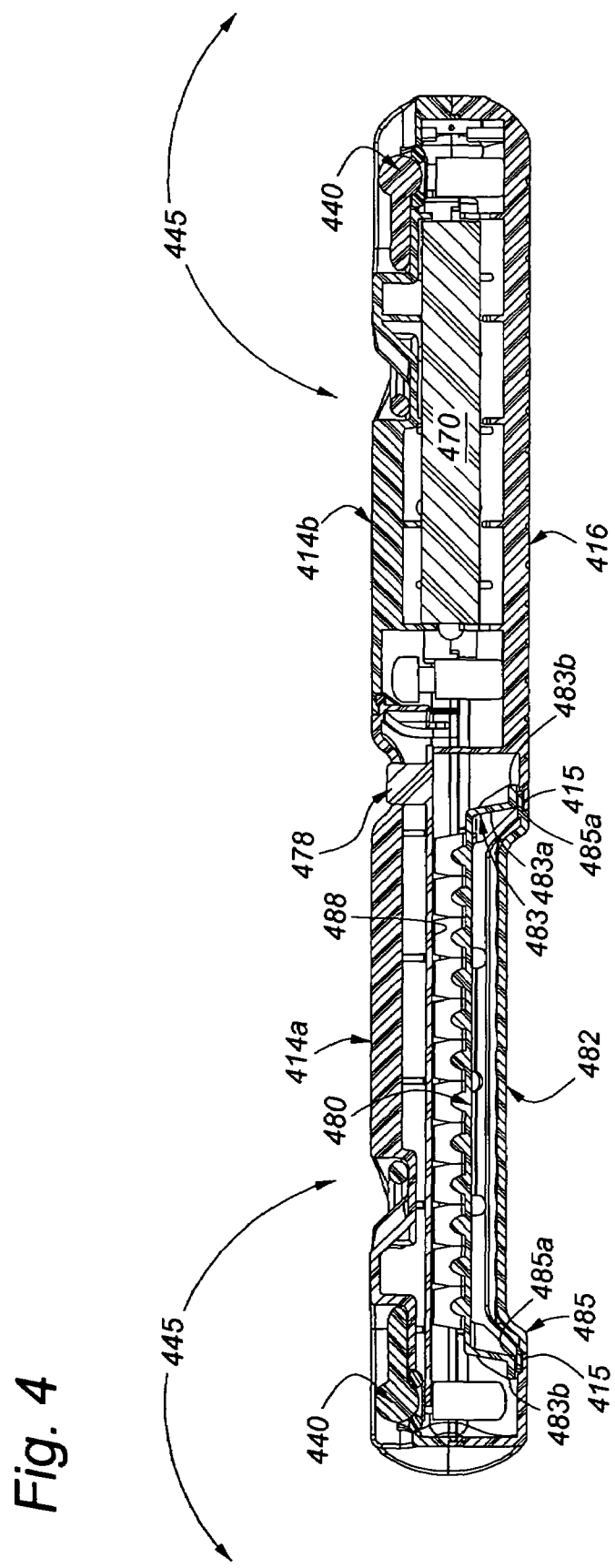
FIG. 4 is a cross-sectional view taken along line 4-4 in FIG. 1.
Figure 5:
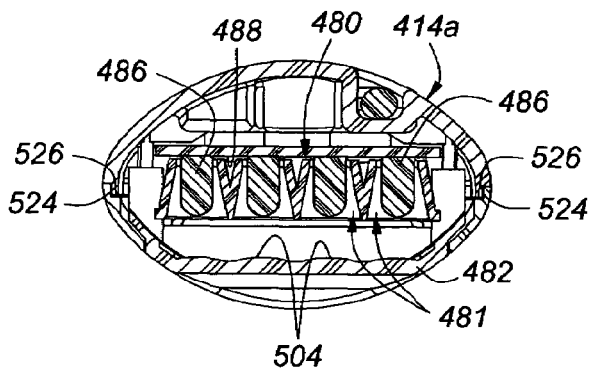
FIG. 5 is a cross-sectional view taken along line 5-5 in FIG. 1.

Referring now to FIGS. 1-6, a rechargeable LED utility light in accordance with the present invention is indicated generally at 410. The utility light 410 includes a vertically and horizontally split hollow light housing 412 formed with a first or upper rear housing portion 414a, a second or lower rear housing portion 414b, and a front housing portion 416. When attached, the rear housing portions 414a and 414b and the front housing portion 416 form the housing 412 with an upper light portion 418 extending from a lower handle portion 420. The front housing portion 416 has a lens opening 419 formed in the upper light portion 418. The rear housing portions 414a and 414b and the front housing 416 are substantially arcuate in horizontal cross section to form the housing 412 with a substantially oval cross section (FIG. 5). The housing 412 is preferably formed of a lightweight material, such as plastic or the like, as the utility light 410 is contemplated to be both handheld and portable. The rear housing portions 414a and 414b each include a plurality of strengthening ribs extending transverse to a longitudinal axis of the light and across interior walls thereof. There is shown in FIG. 3a a plurality of ribs 422c having curved exposed edges. There is shown in FIG. 3b a plurality of ribs 422a and 422b having straight exposed edges.

Figure 6:
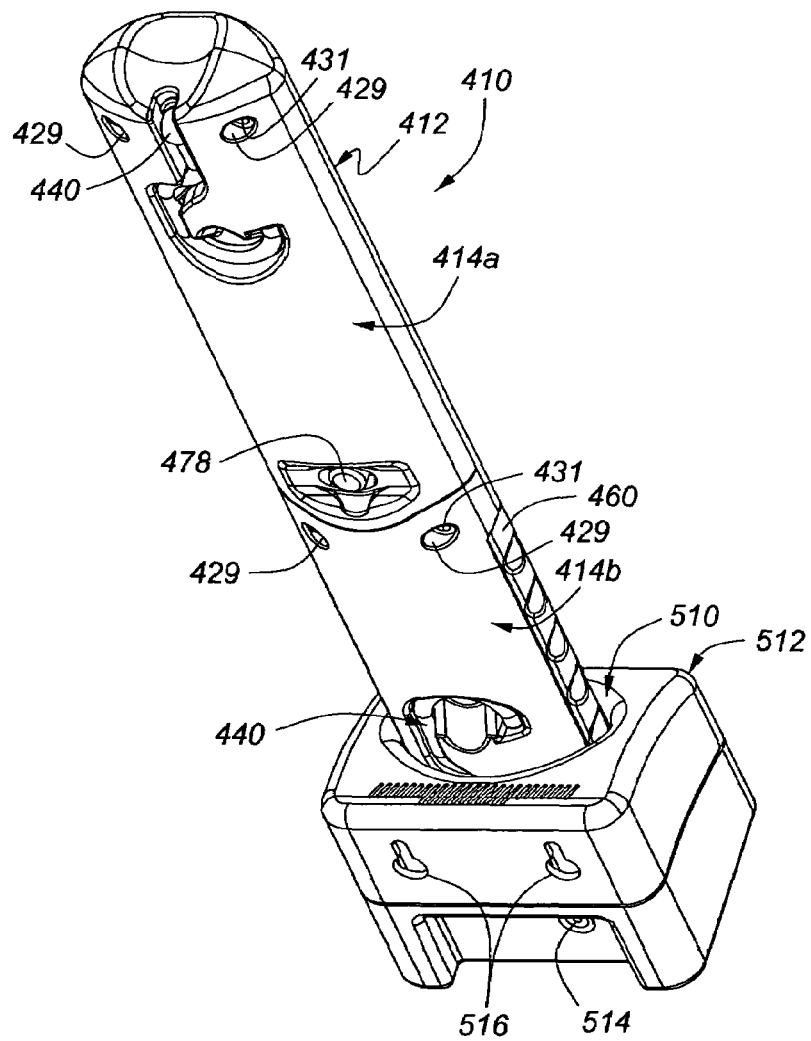
FIG. 6 is a perspective view of the utility light of FIG. 1 shown docked in a charging base.

A plurality of tubular bosses 424, two on the housing portion 414a and four on the housing portion 414b, having a larger diameter base 426 and a smaller diameter free end 428 extend from respective inner surfaces 430a and 430b of the rear housing portions 414a and 414b for receiving respective fasteners 431 (FIG. 6). Each boss 424 is open to an associated recess 429 in an exterior surface of the respective rear housing portion. The fasteners 431 extend through the recesses 429 and the bosses 424 and threadably engage corresponding posts 432 extending inwardly from an interior surface 417 of the front housing portion 416 to secure the rear housing portions 414a and 414b and the front housing portion 416 together to form the housing 412. The front housing portion 416 includes a plurality of transverse strengthening ribs 423a and 423b extending from the interior surface 417 and having straight exposed edges. During assembly, the smaller diameter end 428 of each of the bosses 424 is received by a corresponding aperture or counterbore 434 formed in a free end of an associated one of the posts 432 of the front housing portion 416.

An exterior surface 436a of the upper rear housing portion 414a has a hook recess or channel 438a formed therein and an exterior surface 436b of the lower rear housing portion 414b has a hook recess or channel 438b formed therein, each recess receiving and releasably storing a hook member 440 therein. The hook members 440 include, respectively, a ball portion 442 that is attached to a shank portion 444. The recesses 438a and 438b each have a respective closed bottom wall 446a (FIG. 3a) and 446b (FIG. 3b) at the interior surfaces 430a and 430b of the rear housing portions 414a and 414b, best seen in FIGS. 3a and 3b. The wall 446a interrupts two of the ribs 422c in the upper housing portion 414a, while the wall 446b extends through but not above the ribs in the lower housing portion 414b. The shape of the recesses 438a and 438b corresponds to the shape of the hook members 440 in plan view. When the hook members 440 are disposed in a "stored" position in the respective recess 438a and 438b, the hook members 440 do not extend above the exterior surfaces 436a and 436b of the rear housing portions 414a and 414b. Formed in a side wall of a hook portion of each of the recesses 438a and 438b is a respective sloped surface 437a and 437b that provides access to the hook members 440 by a human finger for improved removal and stowage for the hook members 440.

The ball portion 442 of each of the hook members 440 cooperates with a respective ball retainer 448 disposed between each of the rear housing portions 414a and 414b and the front housing portion 416 when the housing 412 is assembled. Each ball retainer 448 includes a pair of retaining arms 450 extending from opposing sides of a cup shaped ball receiver 452. Each of the retaining arms 450 is apertured to receive an associated one of the ends 428 of the mating bosses 424 of the light portion 418 and handle portion 420, respectively. Each of the ball receivers 452 cooperates with a pair of curved surfaces 454 formed on opposite sides of apertures 456a and 456b in the walls 446a and 446b respectively to retain the ball portion 442 of the hook member 440. The ball receivers 452, the surfaces 454 and the ball portions 440 function as ball and socket attachments for the hook members 440. As shown in FIG. 4, the hook members 440 can rotate between the stored position shown and an extended "use" position as indicated by an arrow 445. Once out of the recesses 438a and 438b, the hook members 440 are free to rotate about their respective longitudinal axes. The hook members 440, therefore, provide a means for placing and orienting the utility light 410 during use.

Each of a pair of elongated handle cushions 460 includes a plurality of attachment fingers 462 extending from a rear surface and having a stop portion 464 and a shaft portion 466. The handle cushions 460 are attached to opposite sides of the handle portion 420 of the housing 412 with each of the shaft portions 466 received in corresponding recesses 468 formed in the mating edges of lower rear housing portion 414b and the front housing portion 416. The stop portions 464 prevent removal of the cushions 460 from the housing 412 after assembly. The handle cushions 460 are each preferably constructed of a soft, easily deflectable material and include transverse grooves 467 formed in an outer surface shaped and spaced for receiving human fingers.

A battery 470 is disposed in a cavity formed between the lower rear housing portion 414b and the front housing portion 416 of the handle portion 420. The battery 470 is preferably a rechargeable battery of conventional type, such as a nickel metal hydride battery or similar rechargeable-type battery. The battery 470 is maintained in position in the cavity between the ribs 423a and 422a (front-to-rear) and between the mating pairs of the ribs 422b and 423b (top-to-bottom). A plurality of protrusions 472 (FIG. 2a) extending from the interior surface 417 of the front housing portion 416 cooperate with a corresponding plurality of recesses 474 formed in the lower rear housing portion 414b to align the housing portions and prevent side-to-side movement of the battery 470.

The hollow housing 412 also forms a space between the upper rear housing portion 414a and the front housing portion 416 for receiving a light source such as an LED circuit board assembly 476 having a plurality of LEDs 486 mounted on a front surface 488 and a switch 478 extending from a rear surface thereof. A reflector member 480 is positioned between the assembly 476 and a lens member 482. The switch 478 is preferably a push button type and extends through an aperture 484 formed in the upper rear housing portion 414a. The LEDs 486, best seen in FIG. 5, extend from a front surface 488 of the assembly 476. The LEDs 486 are connected to the battery 470 through the switch 478 for selective operation to emit light through the lens 482.

The reflector member 480 includes a plurality of spaced apart through apertures 481. The front surface of the reflector member 480 is preferably mirror chrome plated or has a similar highly reflective surface. The apertures 481 correspond in number and position to the LEDs 486 on the circuit board assembly 476. The walls of the reflector member 480 that define each of the apertures 481 are also mirror chrome plated and taper radially outwardly from the rear surface of the reflector member 480 to the front surface of the reflector member 480 to form a generally cone-shape profile, best seen in FIG. 5. A width, indicated by an arrow 492 in FIG. 2, of the reflector member 480 is greater than a width, indicated by an arrow 490, of the circuit board assembly 476. A plurality of tubular support legs 494 is formed on the periphery of the reflector member 480. The support legs 494 extend rearwardly from the rear surface of the reflector member 480 and, because the width 492 is greater than the width 490, when the reflector member 480 is placed over the circuit board assembly 476, the support legs 494 extend beyond the periphery of the circuit board assembly 476 and rearwardly of the rear surface of the circuit board assembly 476. The support legs 494 engage with corresponding support pins 496 extending inwardly from outer edges of the support ribs 422c of the upper rear housing portion 414a. A flange 483 extends from opposed upper and lower ends of the reflector member 480. The flange 483 has an upwardly extending portion 483a and an outwardly extending portion 483b, best seen in FIG. 4.

The lens member 482 is received in the lens opening 419 extending through the upper portion of the front housing portion 416 during assembly of the utility light 410. The lens member 482 is preferably constructed of clear plastic material or similar material. The lens member 482 includes a plurality of posts 498 extending rearwardly therefrom that cooperate with apertures 500 formed in the reflector member 480 during assembly of the utility light 410. The lens member 482 includes a flange 485 extending from opposed upper and lower ends thereof. The flange 485 includes a stepped portion 485a, best seen in FIG. 4. A flange 415 extends from each of upper and lower edges that define the lens opening 419, best seen in FIG. 4, for cooperating with the stepped portions 485a during assembly of the utility light 410.

As seen in FIG. 5 the lens member 482 has a plurality of focusing portions 504 that correspond in number and position to the LEDs 486. Each of the focusing portions 504 is formed as a convex protrusion on the rear surface of the lens member 482 facing the reflector member 480. The focusing portions 504 collect and focus light from the corresponding LEDs 486 to generate a collective focused beam of light exiting the lens member 482. However, the rear surface of the lens member 482 could be flat, so that no focusing is provided, or the areas adjacent the LEDs 486 could be formed with concave shapes, so that the light exiting the lens member 482 is dispersed for a flood light effect.

A pair of charging contacts 506 are each disposed in a corresponding slot 508 formed between the lower rear housing portion 414b and the front housing portion 416 when the housing 412 is assembled. The contacts 506 are electrically connected to the battery 470. The contacts 506 are adapted to engage with corresponding electrical contacts (not shown) provided in a bottom of an upwardly facing docking cavity 510 of a charging base 512, best seen in FIG. 6. The cavity 510 is contoured to the shape of the lower end of the housing 412. The charging base 512 includes an aperture 514 formed in a rear wall for passing a power cord (not shown). The power card connects between a source of AC power, such as a wall plug, and a converter circuit with integral transformer, discussed in more detail below, for charging the battery 470 when the utility light 410 is placed in the charging base 512. The charging base 512 also includes elongated attachment slots 516 formed in the rear wall for easier mounting on the charging base on, for example, a wall (not shown) or the like.

The switch 478 is easily actuated by a thumb or finger of a person (not shown) holding the handle portion 420 to light the LEDs 486 of the circuit board assembly 476 with one hand while also orienting and hanging the light 410 with the same hand. A flexible cover 479 can be provided on the switch 478 to protect it from dirt and liquids.

Figure 7:
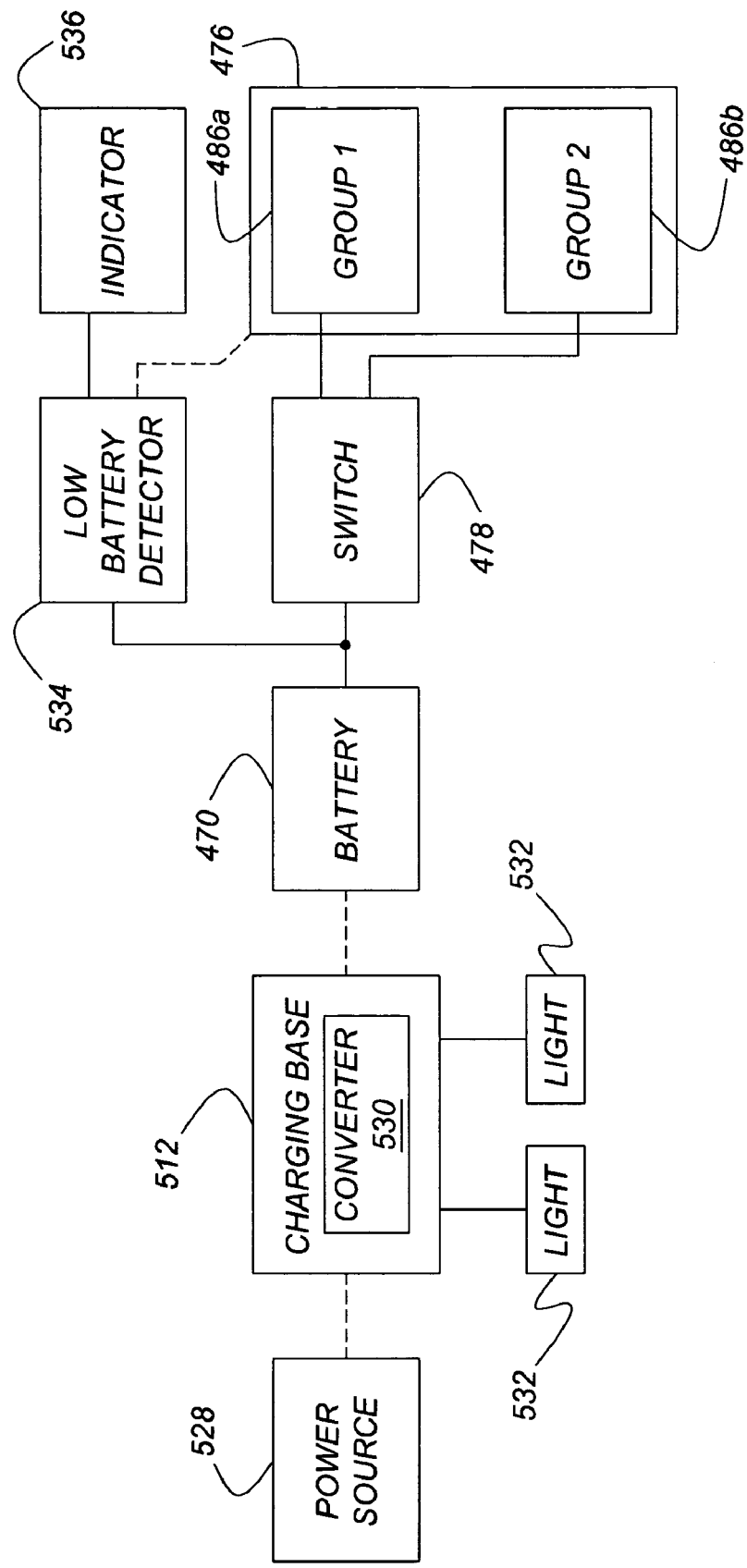
FIG. 7 is an electrical schematic of the utility light shown in FIG. 1.

An electrical schematic of the utility light 410 is shown in FIG. 7. An AC to DC converter 530 is provided in the charging base 512 for converting AC power from a source 528 to the lower voltage DC power required to charge the battery 470 when the utility light 410 is placed in the charging base 512. The charging base 512 may also include LED indicator lights 532, such as a red LED (off) and a green LED (on), to indicate the charging status of the utility light 410, preferably mounted in a front surface of the base 512. Those skilled in the art, however, will appreciate that the indicator lights 532 may be located on any surface of the base 512 to enable a user to ascertain the charging status of the utility light 410.

The electrical power from the battery 470 is directed through the switch 478 to the LED circuit board assembly 476. The switch 478 has at least a pair of "on" positions wherein in a first "on" position the switch 478 can direct electrical power from the battery 470 to a first or central group 486a of the LEDs 486 wherein only those LEDs in a central portion of the assembly 476 are lighted. In a second "on" position, the switch 478 directs power to light a second group 486b including all of the LEDs 486. The utility light 410 also includes a low battery voltage detector 534 that, when the voltage in the battery 470 drops below a predetermined level, will provide power to a low battery power indicator 536. The indicator 536 is preferably a red LED mounted in an aperture in the front housing portion 416, best seen in FIG. 1. The indicator 536 will blink intermittently when the battery voltage is low. Alternatively, the low battery voltage detector 534 can be connected directly (dashed line) to the LED circuit board assembly 476 to cause selected ones of the LEDs 486, such as the first group 486a, to flash and indicate to the user that the battery 470 is low.

The utility light 410 shown in FIGS. 1-6 has the LEDs 486 arranged in four columns of twelve rows for a total of forty-eight LEDs. The center two columns can be the first group 486a such that one half of the total light output is generated by twenty-four LEDs in the first "on" position of the switch 478. All of the columns can be included in the second group 486b such that the total light output is generated by forty-eight LEDs in the second "on" position of the switch 478. An alternative array can consist of three columns and eight rows for a total of twenty-four LEDs. In that case, the center column can be the first group 486a and all the LEDs can be the second group 486b. The twenty-four LED array permits a smaller housing 412 since the battery 470 and the circuit board assembly 476 will be smaller. Such a utility light is shown in FIGS. 1-7 of patent application Ser. No. 29/234,468 incorporated herein by reference.

In another alternative embodiment, the switch 478 can be a double switch wherein the group 486a can be controlled by one switch button and the group 486b can be the remaining LEDs and can be controlled by another switch button. For example, the utility light 410 shown in FIGS. 1-7 could have half of the LEDs 486 controlled by the one switch button and the other half of the LEDs controlled by the other switch button.

Of course, any number of LEDs can be used. For example, the patent application Ser. No. 10/915,527, incorporated herein by reference, shows an array of four columns and six rows (FIG. 2) for a total of twenty-four LEDs. The patent application Ser. No. 10/914,805, incorporated herein by reference, shows an array of three columns and ten rows (FIG. 2) for a total of thirty LEDs and an array of three columns and twenty rows (FIG. 6) for a total of sixty LEDs.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A portable utility light comprising:
an elongated vertically and horizontally split hollow light housing comprising an upper rear housing portion, a lower rear housing portion and a front portion extending the length of the upper and lower rear housing portions and having an upper light portion connected to a lower handle portion, said light portion having a lens opening formed therein, wherein said housing extends longitudinally along said vertical split and is oriented for use along said vertical split and having a lens opening and a switch aperture formed therein;
a plurality of LEDs mounted in said housing adjacent said lens opening; and
a switch mounted in said switch aperture and connected to said LEDs for selectively applying electrical power to said LEDs, whereby when said switch is connected to a source of electrical power, said switch has a first "on" position connecting the source of electrical power to a first group of said LEDs being less than a plurality of said LEDs and a second "on" position connecting the source of electrical power to a second group of said LEDs.

2. The light according to claim 1 wherein said LEDs are mounted in rows and columns.

3. The light according to claim 2 wherein said first group of said LEDs includes at least one of said columns.

4. The light according to claim 1 wherein said second group of said LEDs includes all of said LEDs.

5. The light according to claim 1 wherein said second group of said LEDs includes all of said LEDs not included in said first group.

6. The light according to claim 1 wherein said housing includes a front housing portion having said lens opening formed therein, an upper rear housing portion attached to said front housing portion and having said switch aperture formed therein and a lower rear housing portion attached to said front housing portion.

7. The light according to claim 1 including at least one handle cushion mounted on said housing.

8. The light according to claim 1 wherein said housing has a hook recess formed therein and including a hook member attached to said housing for movement between a stored position in said hook recess and a use position out of said hook recess.

9. The light according to claim 1 wherein said housing has a hook recess formed therein adjacent each of upper and lower ends of said housing and including a pair of hook members each attached to said housing for movement between a stored position in an associated one of said hook recesses and a use position out of said associated hook recess.

10. The light according to claim 1 including a rechargeable battery mounted in said housing and being connected to said switch for providing electrical power to said LED; at least one electrical contact mounted on said housing and connected to said battery and a charging base for releasably retaining said housing and providing electrical power through said at least one electrical contact to recharge said battery.

11. A portable rechargeable utility light comprising:
a vertically and horizontally split hollow housing comprising an upper rear housing portion, a lower rear housing portion and a front portion extending the length of the upper and lower rear housing portions and having an upper light portion connected to a lower handle portion, said light portion having a lens opening formed therein, wherein said housing extends longitudinally along said vertical split and is oriented for use along said vertical split;
said front portion comprising an elongated front housing portion having a lens opening formed therein;
said upper rear housing portion having a hook recess and a switch aperture formed therein;
said lower rear housing portion and said upper rear housing portion being attached to said front housing portion to form a hollow light housing;
a rechargeable battery mounted in said light housing adjacent said lower rear housing portion;
a plurality of LEDs mounted in said light housing adjacent said lens opening;
a switch mounted in said switch aperture and connected between said battery and said LEDs for selectively applying electrical power to said LEDs;
a hook member attached to said light housing for movement between a stored position in said hook recess and a use position out of said hook recess; and
a transparent lens member mounted in said lens opening permitting light generated by said LEDs to exit said light housing.

12. The light according to claim 11 wherein said switch has a first "on" position for connecting a first group of said LEDs to said battery, said first group being less than all of said LEDs.

13. The light according to claim 12 wherein said switch has at least a second "on" position for connecting a second group of said LEDs to said battery, said second group including all of said LEDs.

14. The light according to claim 12 wherein said switch has at least a second "on" position for connecting a second group of said LEDs to said battery, said second group including all of said LEDs not included in said first group.

15. A portable rechargeable utility light comprising:
a vertically and horizontally split hollow housing comprising an upper rear housing portion, a lower rear housing portion and a front portion extending the length of the upper and lower rear housing portions and having an upper light portion connected to a lower handle portion, said light portion having a lens opening formed therein, wherein said housing extends longitudinally along said vertical split and is oriented for use along said vertical split;
said front portion comprising an elongated front housing portion having a lens opening formed therein; and
wherein one of said upper or lower rear housing portions includes a hook recess and a switch aperture formed therein, said rear housing portion being attached to said front housing portion to form a hollow light housing;
at least one handle cushion attached to said light housing;
a rechargeable battery mounted in said light housing;
a plurality of LEDs mounted in said light housing adjacent said lens opening;

a switch mounted in said switch aperture and connected between said battery and said LEDs for selectively applying electrical power to said LEDs;

a hook member attached to said light housing for movement between a stored position in said hook recess and a use position our of said hook recess;

a reflector member mounted in said light housing and having a plurality of apertures formed therein, each of said apertures receiving an associated one of said LEDs; and a transparent lens member mounted in said lens opening permitting light generated by said LEDs to exit said light housing.

16. The light according to claim 15 including a pair of electrical contacts mounted on said light housing and connected to said battery and a charging base for releasably retaining said light housing and providing electrical power through said electrical contacts to recharge said battery.

17. The light according to claim 15 including a low battery detector connected to said battery, an indicator aperture formed in said front housing portion and a low battery indicator mounted in said indicator aperture and being connected to said low battery detector for visually indicating a low battery condition of said battery.

18. The light according to claim 15 wherein said light housing is generally arcuate in profile.

19. The light according to claim 15 wherein said LEDs are mounted on a circuit board in rows and columns.

20. The light according to claim 15 wherein said switch has a first "on" position for connecting a first group of said LEDs to said battery, said first group being less than all of said LEDs, and at least a second "on" position for connecting a second group of said LEDs to said battery, said second group including at least all of said LEDs not included in said first group.

* * * * *